(12) United States Patent
Nitsan et al.

(10) Patent No.: US 10,496,512 B2
(45) Date of Patent: Dec. 3, 2019

(54) VISUALIZATION OF ERROR FLOWS ASSOCIATED WITH ERRORS OF DIFFERENT TYPES IN INSTANCES OF APPLICATION TRANSACTIONS

(71) Applicant: Hewlett Packard Enterprise Development LP, Houston, TX (US)

(72) Inventors: Amichai Nitsan, Yehud (IL); Inbar Shani, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 467 days.

(21) Appl. No.: 15/151,753

(22) Filed: May 11, 2016

(65) Prior Publication Data
US 2017/0329664 A1    Nov. 16, 2017

(51) Int. Cl.
*G06F 11/07* (2006.01)
*G06F 11/32* (2006.01)
*G06F 3/0484* (2013.01)

(52) U.S. Cl.
CPC .......... *G06F 11/321* (2013.01); *G06F 3/0484* (2013.01); *G06F 11/0751* (2013.01); *G06F 11/0769* (2013.01); *G06F 11/0772* (2013.01); *G06F 11/323* (2013.01); *G06F 11/327* (2013.01)

(58) Field of Classification Search
CPC .............. G06F 11/0709; G06F 11/079; G06F 11/0772; G06F 11/0751; G06F 11/0736; G06F 11/0769; G06F 11/32; G06F 11/321; G06F 11/327; G06F 11/323
See application file for complete search history.

(56) References Cited

U.S. PATENT DOCUMENTS

| 6,003,143 | A | * | 12/1999 | Kim | ........... G06F 11/323 706/46 |
| 6,519,766 | B1 | * | 2/2003 | Barritz | ........... G06F 11/3466 714/E11.2 |
| 8,621,287 | B1 | * | 12/2013 | Ethington | ........... G06F 11/0709 714/25 |
| 8,832,498 | B1 | * | 9/2014 | Jain | ........... G06F 17/30017 714/25 |
| 9,032,339 | B2 | | 5/2015 | De et al. | |
| 9,632,858 | B2 | * | 4/2017 | Sasturkar | ........... G06F 11/0709 |
| 2007/0028220 | A1 | | 2/2007 | Miller et al. | |
| 2007/0174710 | A1 | * | 7/2007 | Duan | ........... G06F 11/0727 714/38.14 |

(Continued)

OTHER PUBLICATIONS

Wikipedia's Asynchronous method invocation historical version published Jan. 8, 2016 https://en.wikipedia.org/w/index.php?title=Asynchronous_method_invocation&oldid=698828647 (Year: 2016).*

(Continued)

*Primary Examiner* — Joseph O Schell (57) ABSTRACT

Error data may be collected. The error data may represent a first plurality of errors of a first type and a second plurality of errors of a second type to occur in a plurality of instances of an application transaction. Visualization data may be generated. The visualization data may represent an error flow diagram to display on an output device. The error flow diagram may comprise a first block having a first visual property based on a first number of the first plurality of errors, a second block having a second visual property based on a second number of the second plurality of errors, and a first linkage between the first block and the second block.

20 Claims, 5 Drawing Sheets

(56) References Cited

U.S. PATENT DOCUMENTS

| | | | | |
|---|---|---|---|---|
| 2012/0304026 | A1* | 11/2012 | Khanna | G06F 11/0715 |
| | | | | 714/57 |
| 2013/0298110 | A1* | 11/2013 | Boden | G06F 11/3676 |
| | | | | 717/125 |
| 2014/0258954 | A1* | 9/2014 | De | G06F 17/504 |
| | | | | 716/113 |
| 2015/0213631 | A1* | 7/2015 | Vander Broek | G06T 11/206 |
| | | | | 345/589 |
| 2016/0004629 | A1* | 1/2016 | Bharara | G06F 11/3692 |
| | | | | 714/38.1 |
| 2017/0017566 | A1* | 1/2017 | Lundstrom | G06F 11/3688 |
| 2017/0270026 | A1* | 9/2017 | Kumar | G06F 11/3636 |

OTHER PUBLICATIONS

Appdynamics, "Appdynamics Pro Documentation," (Research Paper); Introduction and Tutorials, Version 3.8.x, 90 pages, May 21, 2014.

BMC Software, "Quickly Pinpoint and Resolve Problems in J2EE Applications," (Research Paper), Technical White Paper, Dec. 14, 2007, 11 pages, available at http://documents.bmc.com/products/documents/67/12/86712/86712.pdf.

Bond, A. M., "WebMethods insight for WebMethods Integration Server," (Research Paper), Technical White Paper, Oct. 16, 2009, 16 pages, available at http://download.kennisportal.com/KP/GMC/webMethodsInsightForWebMethods.pdf.

Haruksteiner, P., "Transaction Flow," (Web Page), dynaTrace 6.0, Dynatrace Community, Sep. 30, 2014, 9 pages, available at https://community.dynatrace.com/community/display/DOCDT60/Transaction+Flow.

Karnane, K. et al., "Automating Root-Cause Analysis to Reduce Time to Find Bugs by Up to 50%," (Research Paper), Cadence Design Systems, Apr. 27, 2015, 9 pages, available at https://www.cadence.com/rl/Resources/white_papers/indago_debug_platform_wp.pdf.

* cited by examiner

VISUALIZATION OF ERROR FLOWS ASSOCIATED WITH ERRORS OF DIFFERENT TYPES IN INSTANCES OF APPLICATION TRANSACTIONS

BACKGROUND

Applications may exhibit a variety of errors. For example, during an execution flow, an application may exhibit errors when interacting with various layers of a computing system, such as a computing layer and a database layer.

BRIEF DESCRIPTION

Some examples are described with respect to the following figures.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

As understood herein, an "application transaction" is an application's execution flow, i.e. a sequence of operations executed by code of the application. In some examples, multiple different application transactions can be implemented by an application, depending on execution path followed by a particular executed instance of the application. In some examples, an application transaction may include any sequence of operations, such as any subset of operations from when an application begins and ends execution. As understood herein, "code" refers to computer program instructions, e.g. instructions executable by a processor. In various examples, a portion of code may include one subroutine or multiple subroutines.

In some examples, an application transaction may be triggered by an HTTP request interacting with a web server. In some examples, the application transaction triggered by the HTTP request may include an execution flow across several layers (e.g. all layers) of a computing system, e.g. including a computing layer (e.g. server layer) comprising at least one computing device (e.g. server) and a database layer comprising at least one database server. For example, when the application transaction interacts with the computing layer, code may run in one server and may make function calls to another computing device (e.g. server). The code may then make function calls to other layers, such as to database servers in a database layer. In some examples, an application transaction may begin in a user computing device (e.g. mobile computing device, laptop computer, desktop computer, etc.) then make function calls to servers, other computers, and database servers, etc. In an example, an application transaction may be a sequence of operations to cause a webpage to display, at the request of a user.

2

Applications may exhibit a variety of errors when executing an application transaction such as that described above. For example, during an application transaction, the application may exhibit errors when interacting with the various layers described above. Example errors include but are not limited to code exceptions, HTTP errors, and custom errors, such as when an API function that is called returns an error code.

In some examples, software developers may perform root cause analysis when an application is experiencing a malfunction. Thus, developers may search for errors such as those described above resulting from execution of the application. However, determining which errors that are the root cause of the malfunction may be difficult, because many other errors may occur that are not the root cause. For example, many errors may not affect functionality of the application, and/or errors that are the root cause may generate a chain reaction of other errors that may mask the errors that are the root cause.

Accordingly, the present disclosure provides examples in which the errors associated with application transactions may be visualized. For example, the visualization may allow two different errors that occur in the same order in multiple instances of an application transaction to be shown in an error flow diagram linking the two different errors. In some examples, the visualization may allow a user, such as an information technology (IT) professional, to more easily spot patterns and determine which errors are at the root cause of the malfunction of the application.

Figure 1:
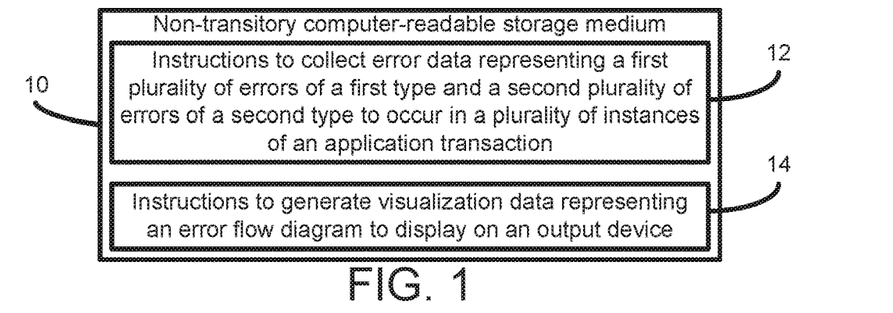
FIG. 1 is a block diagram illustrating a non-transitory computer readable storage medium according to some examples.

FIG. 1 is a block diagram illustrating a non-transitory computer readable storage medium 10 according to some examples. The non-transitory computer readable storage medium 10 may include instructions 12 executable by a processor to collect error data representing a first plurality of errors of a first type and a second plurality of errors of a second type to occur in a plurality of instances of an application transaction. The non-transitory computer readable storage medium 10 may include instructions 14 executable by a processor to generate visualization data representing an error flow diagram to display on an output device, the error flow diagram comprising a first block having a first visual property based on a first number of the first plurality of errors, a second block having a second visual property based on a second number of the second plurality of errors, and a first linkage between the first block and the second block.

Figure 2:
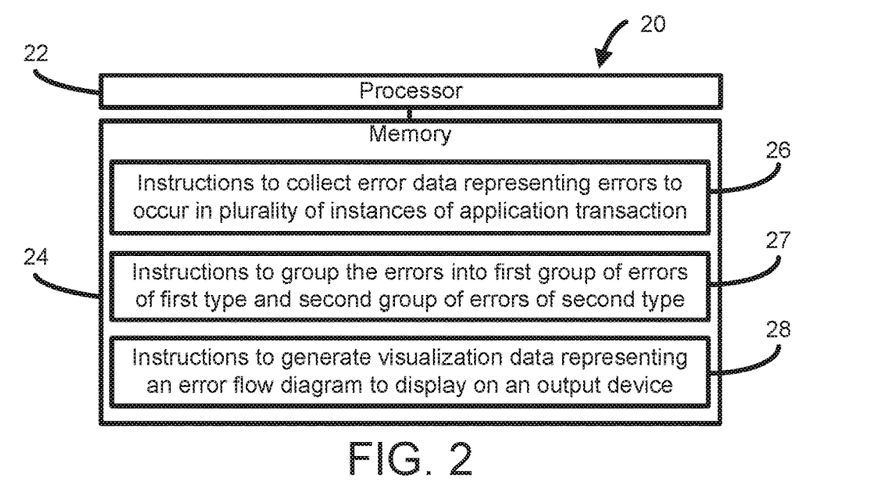
FIGS. 2 and 4 are block diagrams illustrating systems according to some examples.

FIG. 2 is a block diagram illustrating a system 20 according to some examples. The system 20 may include a processor 22 and a memory 24. The memory 24 may include instructions 26 executable by the processor to collect error data representing errors to occur in a plurality of instances of an application transaction. The memory 24 may include instructions 27 executable by the processor to group the errors into a first group of errors of a first type and a second group of errors of a second type. The memory 24 may include instructions 28 executable by the processor to generate visualization data representing an error flow diagram to display on an output device, the error flow diagram comprises a first block, a second block, and a first linkage between the first block and the second block, wherein the first linkage has a first visual property based on at least one of a first number of the first group of errors and a second number of the second group of errors.

Figure 3:
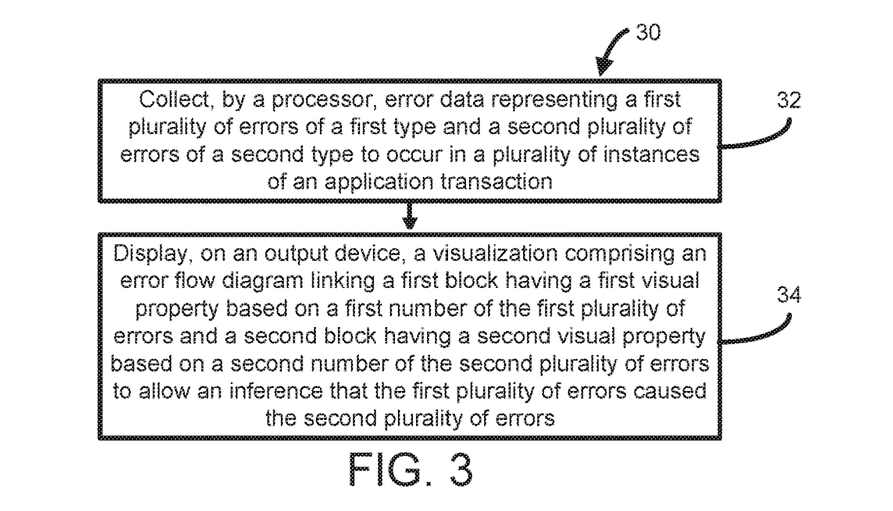
FIGS. 3 and 12 are flow diagrams illustrating methods according to some examples.

FIG. 3 is a flow diagram illustrating a method 30 according to some examples. The following may be performed by a processor. At 32, error data representing a first plurality of errors of a first type and a second plurality of errors of a second type to occur in a plurality of instances of an application transaction may be collected by a processor. At 34, a visualization may be displayed on an output device. The visualization may comprise an error flow diagram linking a first block having a first visual property based on a first number of the first plurality of errors and a second block having a second visual property based on a second number of the second plurality of errors to allow an inference that the first plurality of errors caused the second plurality of errors.

Figure 4:
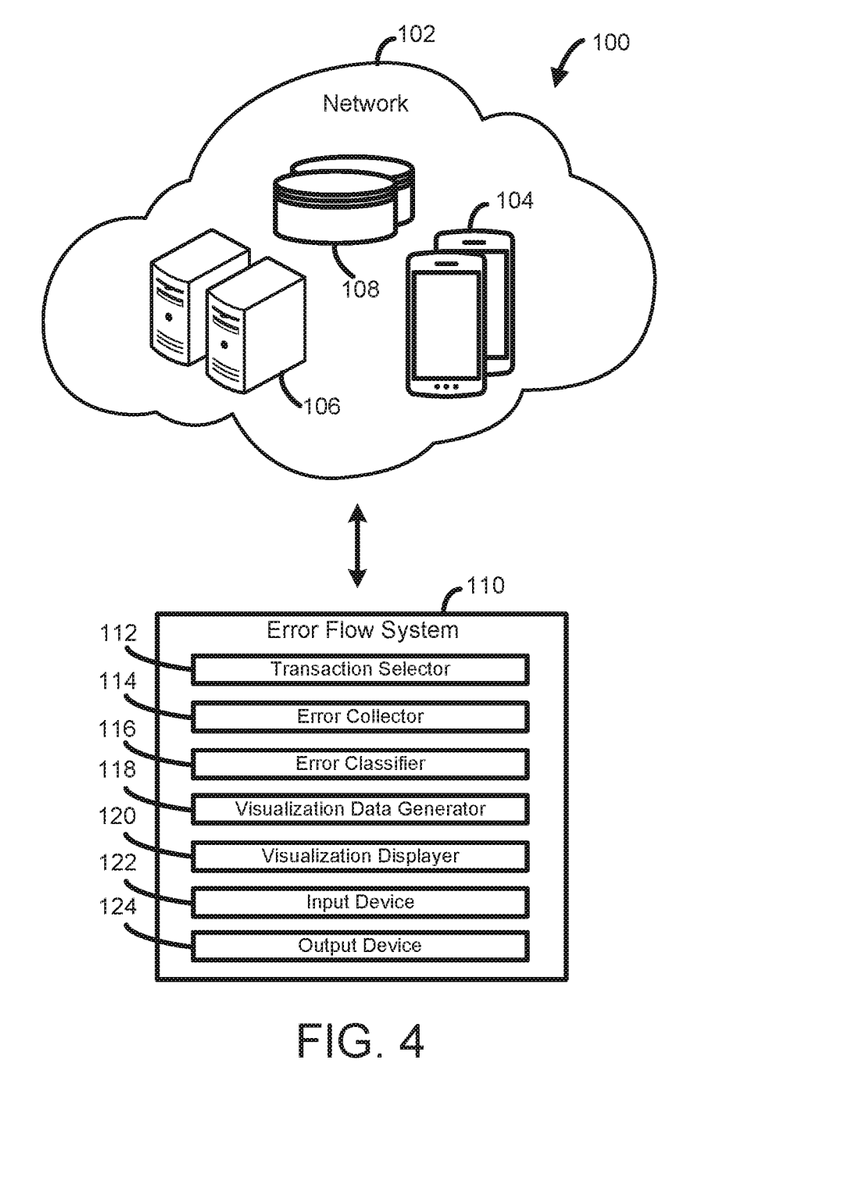

FIG. 4 is a block diagram illustrating a system 100 according to some examples. The system 100 includes a network 102 that may include an application layer 104 that includes applications (e.g. mobile applications, web applications, on-premise applications, cloud based applications, etc.), e.g. running on user computing devices or other computing devices such as servers. The network 102 may include a computing layer 106 including computing devices such as servers, and a database layer 108 including database servers. The network 102 may, for example, be a local area network (LAN), wide area network (WAN), the Internet, or any other network. In some examples, the network 102 may comprise components of an information technology (IT) infrastructure of an organization, such as a data center.

The system 100 may include an error flow system 110. The error flow system 110 may include a transaction selector 112, error collector 114, error classifier 116, visualization data generator 118, and visualization displayer 120. The error flow system 110 may be part of an administrator computing device to be operated by a user such as an IT professional. The error flow system 110 may support direct user interaction. For example, the error flow system 110 may include user input device 122, such as a keyboard, touchpad, buttons, keypad, dials, mouse, track-ball, card reader, or other input devices. Additionally, the error flow system 110 may include output device 124 such as a liquid crystal display (LCD), video monitor, touch screen display, a light-emitting diode (LED), or other output devices. The output devices may be responsive to instructions to display textual information and/or graphical data.

In some examples, components of the error flow system 110, such as the computing devices on which the application layer 104 may run, the computing devices in the computing layer 106, the database servers in the database layer 108, the transaction selector 112, the error collector 114, the error classifier 116, the visualization data generator 118, and the visualization displayer 120, may each be implemented as a computing system including a processor, a memory such as non-transitory computer readable medium coupled to the processor, and instructions such as software and/or firmware stored in the non-transitory computer-readable storage medium. The instructions may be executable by the processor to perform processes defined herein. In some examples, these components of the error flow system 110 may include hardware features to perform processes described herein, such as a logical circuit, application specific integrated circuit, etc. In some examples, multiple components may be implemented using the same computing system features or hardware.

In some examples, the transaction selector 112 may receive a transaction selection entered by a user (e.g. an administrator or IT professional) into the input device 112. The transaction selection may represent an application transaction that the user is to monitor for errors in a visualization comprising an error flow diagram. For example, the output device 124 may display application transactions (e.g. in a menu) to monitor for errors, and the user may select one of the displayed application transactions. The application transactions may be associated with an application in the application layer 104. In some examples, the user may select multiple application transactions such that their results may be overlaid together in the visualization comprising the error flow diagram. The selection may be based on a criterion, for example any transactions that access a database server in the database layer 108, or a server in the computing device layer 106, etc.

In some examples, the error collector 114 may collect, from an application in the application layer 104 and through a communication interface of the error flow system 110, error data representing errors that occurred in a plurality of instances of the selected application transaction executed by the application in the application layer 104. For each error, the error data may represent the type of error that occurred. Multiple users may be running multiple instances of the application across the application layer 104, and/or some users may, using the application, execute multiple instances of the application transaction at different times. Therefore, the error collector 114 may collect error data relating to each of these instances of the application transaction.

In some examples, the error classifier 116 may, using the collected error data, aggregate the errors into groups based on type. For example, a first group may include errors of a first type, and a second group may include errors of a second type. The first types and the second types may be any of the errors described earlier, such as code exceptions, HTTP errors, custom errors, etc. Any number of types may be identified, such that the errors may be aggregated into any number of groups.

In some examples, the visualization data generator 118 may generate visualization data representing an error flow diagram to display. The error flow diagram may include multiple blocks, wherein each block represents a group of errors corresponding to a type, as classified by the error classifier 116. For example, the error flow diagram may include a first block, a second block, and a linkage between the first and second block.

The linkages and the locations of the blocks may be determined based on the relative locations of errors in application transactions, as will be discussed relative to FIGS. 5-10. The linkage may indicate a flow from the first block to the second block. The flow may represent an order that errors occur, for example, the errors in the first group represented by the first block may occur before the errors in the second group represented by the second block. Thus, the linkage may be a temporal linkage. Based on this ordering, an inference of causation may be inferred by a user viewing the error flow diagram, e.g. the errors represented by the first block may have caused the errors represented by the second block.

The blocks may have any shape or format, for example a rectangular or circular shape. In some examples, each of the blocks may have a respective visual property that is based upon the number of errors in the group of errors corresponding to the block. The visual property may comprise a size of the block (e.g. the number of errors may be proportional to the size of the block), color of the block, and/or other visual property. In some examples, a block may be shown for a group of errors of a given type in response to the group of errors including at least a threshold number of errors.

The linkages may have various shapes. In some examples, a linkage may be an arrow leading from one block to another block. In some examples, each of the linkages may have a respective visual property that is based upon the number of errors in the group of errors corresponding to the left-hand block to which the linkage links, to the right-hand block to which the linkage links, or to both blocks to which the linkage links. The visual property may comprise a size (e.g. width) of the linkage (e.g. the size such as width of the linkage may increase as the number of errors in the one or two linked blocks increases), color of the block, and/or other visual property.

In some examples, the visualization displayer 120 may cause a visualization to be displayed on the output device 124 using the visualization data representing the error flow diagram. Using the visualization, the user may infer, for example, that errors associated with a first block may have caused errors associated with a second block. Therefore, in some examples, the user may more easily spot patterns and determine which errors are at the root cause of the malfunction of the application.

Figures 5, 8:
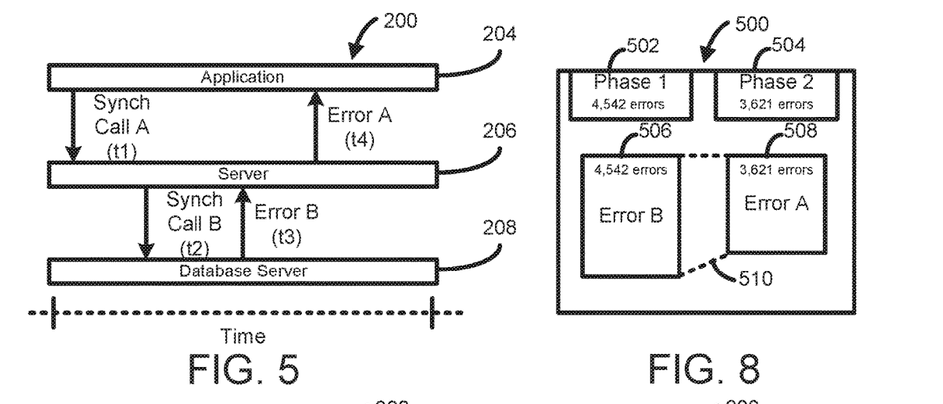
FIGS. 5-7 are diagrams illustrating application transactions according to some examples.
FIGS. 8-11 are visualizations of error flow diagrams according to some examples.
Figures 6, 9:
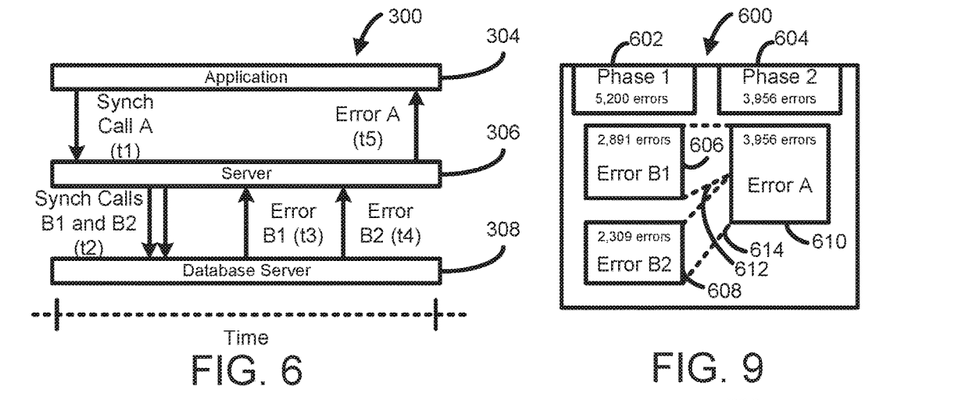
Figures 7, 10:
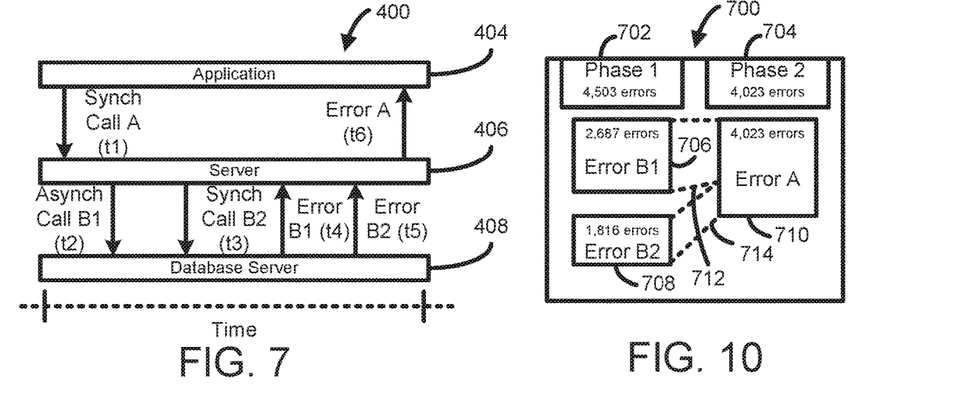

FIGS. 5-7 are diagrams illustrating application transactions 200, 300, and 400 according to some examples. FIGS. 8-10 are visualizations of error flow diagrams 500, 600, and 700 according to some examples. The error flow diagrams 500, 600, and 700 correspond to errors occurring in the respective application transactions 200, 300, and 400. For example, referring to FIG. 4, visualizations representing the error flow diagrams 500, 600, and 700 may be generated and displaying using the error flow system 100 based on application transactions 200, 300, and 400 occurring in the network 102.

As mentioned earlier, the errors in FIGS. 5-10 may be code exceptions, HTTP errors, custom errors, such as when an API function that is called returns an error code, and other errors. In an example, if a database server lacks sufficient memory, then it may be unable to make a computation as requested in an application transaction, resulting in an error.

For illustrative purposes, each of FIGS. 5-7 show applications 204, 304, and 404 in the application layer 104, servers 206, 306, and 406 in the computing layer 106, and database servers 208, 308, and 408 in the database layer 108. However, in other examples, additional applications, servers, and database servers from the application layer 104, computing layer 106, and database layer 108 may participate in the application transactions 200, 300, and 400.

Initially, in each of FIGS. 5-7, the respective applications 204, 304, and 404 may be executed (e.g. by a user) such that respective application transaction 200, 300, and 400 may be executed. In some examples, application transactions may, for example, be triggered by an HTTP request interacting with a server, and may include an execution flow with function calls made across several layers. In some examples, an application transaction may, at the request of a user, cause a webpage to display on the computing device hosting the application. References to "error A" or "error B", for example, may refer to errors of particular types. For example, "error A" may be an HTTP error and "error B" may be a code exception.

Function calls may be "synchronous" or "asynchronous". First code that makes a synchronous function call to second code pauses execution until the second code returns to the first code, at which time the first code continues execution. By contrast, first code that makes an asynchronous function call to second code continues execution while the second code is executing.

In FIG. 5, at time t1, first code of the application 204 running on a computing device hosting the application 204 may perform a function call A to second code (e.g. of an application programming interface (API)) that may run on the server 206. In FIG. 5, function call A is shown as a synchronous function call, therefore the first code may pause execution upon calling the second code. In other examples, function call A may be asynchronous, in which case the first code may continue execution while the second code executes.

At time t2, the second code running on the server 206 may perform a function call B to third code (e.g. of an application programming interface (API)) that may run on the database server 208. In FIG. 5, function call B is shown as a synchronous function call, therefore the second code may pause execution upon calling the third code. In other examples, function call B may be asynchronous, in which case the second code may continue execution while the third code executes.

At time t3, the third code running on the database server 208 may exhibit an error B, and may return to the second code running on the server 206.

At time t4, the second code running on the server 206 may exhibit an error A, and may return to the first code running on the computing device hosting the application 204.

Because the function call A is synchronous, error A occurs after error B, increasing the likelihood that error B caused error A. Therefore, the visualization data generator 118 may infer that error B may have caused or led to error A. In other examples, the function call A may be asynchronous such that error A may occur either before or after error B. In these examples, causation between errors B and A may be less likely than in the case of a synchronous function call A.

As discussed earlier, the error collector 114 and error classifier 116 may collect and group errors from multiple instances of the application transaction. The application transaction 200 may be one instance of multiple instances that are used to generate visualization data. Therefore, once errors from multiple instances of the application transaction (including the instance of the application transaction 200 shown in FIG. 5) are collected and grouped, visualization data representing the error flow diagram 500 of FIG. 8 may be generated by the visualization data generator 118 and to display using the visualization displayer 120.

As shown in FIG. 8, the error flow diagram 500 may include labels 502 and 504 to indicate phases of errors (e.g. first and second phases). In the first phase, block 506 represents 4,542 instances of the application transaction in which error B occurred, and is sized proportionate to the number of instances of error B. In the second phase, block 508 represents 3,621 instances of the application transaction in which error A occurred, and is sized proportionate to the number of instances of error A. Because there are no other blocks in the first and second phases, the label 502 for the first phase indicates that 4,542 errors occurred in the first phase, and the label 504 for the second phase indicates that 3,621 errors occurred the second phase.

Based on a determination by visualization data generator 118, a linkage 510 is generated to point from block 506 to block 508 to indicate that instances of error B may have caused instances of error A in the instances of the application transaction (including application transaction 200). As shown, the linkage 510 may be sized based on the number of errors in the group of errors corresponding to linked block 506 and also based on the number of errors in the group of errors corresponding to linked block 508. For example, as shown, the upper boundary of the linkage 510 extends between the upper edges of the blocks 506 and 508 and the lower boundary of the linkage 510 extends between the bottom edges of the blocks 506 and 508.

In FIG. 6, at time t1, first code of the application 304 running on a computing device hosting the application 304 may perform a function call A to second code (e.g. of an application programming interface (API)) that may run on the server 306. In FIG. 6, function call A is shown as a synchronous function call, therefore the first code may pause execution upon calling the second code. In other examples, function call A may be asynchronous, in which case the first code may continue execution while the second code executes.

At time t2, the second code running on the server 206 may perform function calls B1 and B2 to respective third code and fourth code (e.g. of an application programming interface (API) or different respective APIs) that may run on the database server 308. In FIG. 6, the function calls B1 and B2 are shown to be synchronous and called together by the first code, and the first code may wait to continue execution until both the third and fourth code complete. In other examples, the function calls B1 and B2 may be asynchronous, in which case the second code may continue execution while the third code and fourth code execute. In some examples, one of the function calls may be synchronous and the other may be asynchronous.

At time t3, the third code running on the database server 308 may exhibit error B1, and may return to the second code running on the server 306.

At time t4, the fourth code running on the database server 308 may exhibit error B2, and may return to the second code running on the server 306.

At time t5, the second code running on the server 306 may exhibit an error A, and may return to the first code running on the computing device hosting the application 204.

Because the function call A is synchronous, error A occurs after errors B1 and B2, increasing the likelihood that errors B1 and/or B2 caused error A. Therefore, the visualization data generator 118 may infer that errors B1 and B2 may have caused or led to error A. In other examples, the function call A may be asynchronous such that error A may occur either before or after errors B1 and B2. In these examples, it may be less likely that errors B1 and B2 caused error A than in the case of a synchronous function call A. Additionally, because the function calls B1 and B2 may be performed together to call the third code and fourth code to run in parallel, the errors B1 and B2 may not have caused each other.

As discussed earlier, the error collector 114 and error classifier 116 may collect and group errors from multiple instances of the application transaction. The application transaction 300 may be one instance of multiple instances that are used to generate visualization data. Therefore, once errors from multiple instances of the application transaction (including the instance of the application transaction 300 shown in FIG. 6) are collected and grouped, visualization data representing the error flow diagram 600 of FIG. 9 may be generated by the visualization data generator 18 and to display using the visualization displayer 120.

As shown in FIG. 9, the error flow diagram 600 may include labels 602 and 604 to indicate phases of errors (e.g. first and second phases). In the first phase, block 606 represents 2,891 instances of the application transaction in which error B1 occurred, and is sized proportionate to the number of instances of error B1. Also in the first phase, block 608 represents 2,309 instances of the application transaction in which error B2 occurred, and is sized proportionate to the number of instances of error B2. In the second phase, block 610 represents 3,956 instances of the application transaction in which error A occurred, and is sized proportionate to the number of instances of error A. The label 602 for the first phase indicates that 5,200 errors occurred the first phase based on the total number of errors in blocks 606 and 608. Because there are no other blocks other than block 610 in the second phase, the label 604 for the second phase indicates that 3,956 errors occurred in the second phase.

Based on a determination by visualization data generator 118, linkages 612 and 614 are generated to point from blocks 606 and 608 to block 610 to indicate that instances of errors B1 and B2 may have caused instances of error A in the instances of the application transaction (including application transaction 300). As shown, the linkage 612 may be sized based on the number of errors in the group of errors corresponding to linked block 606 and in the group of errors corresponding to linked block 610, and the linkage 614 may be sized based on the number of errors in the group of errors corresponding to linked block 608 and in the group of errors corresponding to linked block 610. For example, as shown, the upper boundary of the linkage 612 extends between the upper edges of the blocks 606 and 610, and the lower boundary of the linkage 612 extends from the bottom edge of the block 606 to a middle point of the block 610. Additionally, as shown, the upper boundary of the linkage 614 extends from the upper edge of the block 608 to the middle point of the block 610, and the lower boundary of the linkage 614 extends between the bottom edges of the blocks 608 and 610. The middle point of the left side of the block 610 is determined based on the sizes of the linked blocks 606 and 608, e.g. such that the ratio of the portion of the left side of the block 610 above the middle point to the portion of the left side of the block 610 below the middle point is equal to the ratio of number of errors in the group of errors corresponding to linked block 606 to the number of errors in the group of errors corresponding to linked block 608.

In FIG. 7, at time t1, first code of the application 404 running on a computing device hosting the application 404 may perform a function call A to second code (e.g. of an application programming interface (API)) that may run on the server 406. In FIG. 7, function call A is shown as a synchronous function call, therefore the first code may pause execution upon calling the second code. In other examples, function call A may be asynchronous, in which case the first code may continue execution while the second code executes.

At time t2, the second code running on the server 406 may perform a function call B1 to third code (e.g. of an application programming interface (API)) that may run on the database server 408. In FIG. 7, function call B1 is shown as an asynchronous function call, therefore the second code may continue execution while the third code executes. In other examples, the function call B1 may be synchronous, in which case the second code may pause execution upon calling the third code.

At time t3, the second code running on the server 406 may perform a function call B2 to fourth code (e.g. of an application programming interface (API)) that may run on the database server 408. In FIG. 7, function call B2 is shown as a synchronous function call, therefore the second code may pause execution upon calling the fourth code. In other examples, the function call B2 may be asynchronous, in which case the second code may continue execution while the fourth code executes.

At time t4, the third code running on the database server 408 may exhibit error B1, and may return to the second code running on the server 406.

At time t5, the fourth code running on the database server 408 may exhibit error B2, and may return to the second code running on the server 406.

At time t6, the second code running on the server 406 may exhibit an error A, and may return to the first code running on the computing device hosting the application 204.

Because the function call A is synchronous, error A occurs after errors B1 and B2, increasing the likelihood that errors B1 and/or B2 caused error A. Therefore, the visualization data generator 118 may infer that errors B1 and B2 may have caused or led to error A. In other examples, the function call A may be asynchronous such that error A may occur either before or after errors B1 and B2. In these examples, it may be less likely that errors B1 and B2 caused error A than in the case of a synchronous function call A. Additionally, because the function calls B1 and B2 may be performed in such a way that they call the third code and fourth code to run in parallel, the errors B1 and B2 may not have caused each other. If the function calls B1 and B2 had both been synchronous with function call B1 occurring first, then error B1 would have occurred before B2. This would increase the likelihood that error B1 caused error B2.

As discussed earlier, the error collector 114 and error classifier 116 may collect and group errors from multiple instances of the application transaction. The application transaction 400 may be one instance of multiple instances that are used to generate visualization data. Therefore, once errors from multiple instances of the application transaction (including the instance of the application transaction 400 shown in FIG. 7) are collected and grouped, visualization data representing the error flow diagram 700 of FIG. 10 may be generated by the visualization data generator 118 and to display using the visualization displayer 120.

As shown in FIG. 9, the error flow diagram 700 may include labels 702 and 704 to indicate phases of errors (e.g. first and second phases). In the first phase, block 706 represents 2,687 instances of the application transaction in which error B1 occurred, and is sized proportionate to the number of instances of error B1. Also in the first phase, block 708 represents 1,816 instances of the application transaction in which error B2 occurred, and is sized proportionate to the number of instances of error B2. In the second phase, block 710 represents 4,023 instances of the application transaction in which error A occurred, and is sized proportionate to the number of instances of error A. The label 702 for the first phase indicates that 4,503 errors occurred the first phase based on the total number of errors in blocks 706 and 708. Because there are no other blocks other than block 710 in the second phase, the label 704 for the second phase indicates that 4,023 errors occurred in the second phase.

Based on a determination by visualization data generator 118, linkages 712 and 714 are generated to point from blocks 706 and 708 to block 710 to indicate that instances of errors B1 and B2 may have caused instances of error A in the instances of the application transaction (including application transaction 400). As shown, the linkage 712 may be sized based on the number of errors in the group of errors corresponding to linked block 706 and in the group of errors corresponding to linked block 710, and the linkage 714 may be sized based on the number of errors in the group of errors corresponding to linked block 708 and in the group of errors corresponding to linked block 710. For example, as shown, the upper boundary of the linkage 712 extends between the upper edges of the blocks 706 and 710, and the lower boundary of the linkage 712 extends from the bottom edge of the block 706 to a middle point of the block 710. Additionally, as shown, the upper boundary of the linkage 714 extends from the upper edge of the block 708 to the middle point of the block 710, and the lower boundary of the linkage 714 extends between the bottom edges of the blocks 708 and 710. The middle point of the left side of the block 710 is determined based on the sizes of the linked blocks 706 and 708, e.g. such that the ratio of the portion of the left side of the block 710 above the middle point to the portion of the left side of the block 710 below the middle point is equal to the ratio of number of errors in the group of errors corresponding to linked block 706 to the number of errors in the group of errors corresponding to linked block 708.

Figure 11:
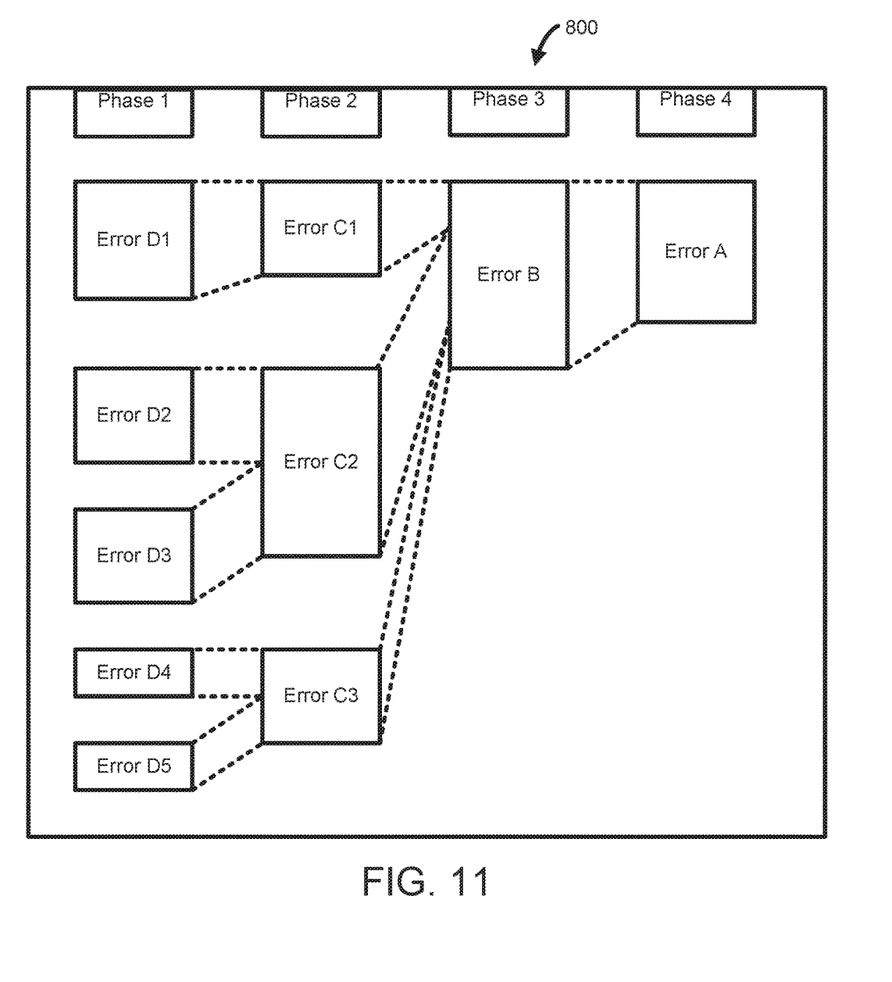

FIG. 11 is a visualization of error flow diagram 800 according to some examples. The error flow diagram 800 may correspond to errors occurring in multiple instances of one application transaction or multiple application transactions (if multiple application transactions are selected for monitoring by the user). As shown, the error flow diagram 800 includes four phases and ten error blocks, with more complex linkages than those shown in FIGS. 8-10. As in the error flow diagrams 500, 600, and 700, the blocks and the linkages may be sized proportionate to the number of instances of errors. Although numbers of errors are not shown in FIG. 11, numbers of errors may be displayed in a similar way as shown in FIGS. 8-10. Thus, the techniques described herein may generate visualizations as complex as needed to monitor any given application transactions.

As shown, the error flow diagrams of FIGS. 8-11 each include a root node (e.g. the block representing error A) which leads to child nodes (blocks representing other errors), which may themselves have other child nodes. In this way, each of the error flow diagrams may form a tree with a root node. However, in other examples, other structures may be formed that do not follow the tree structure described above.

Figure 12:
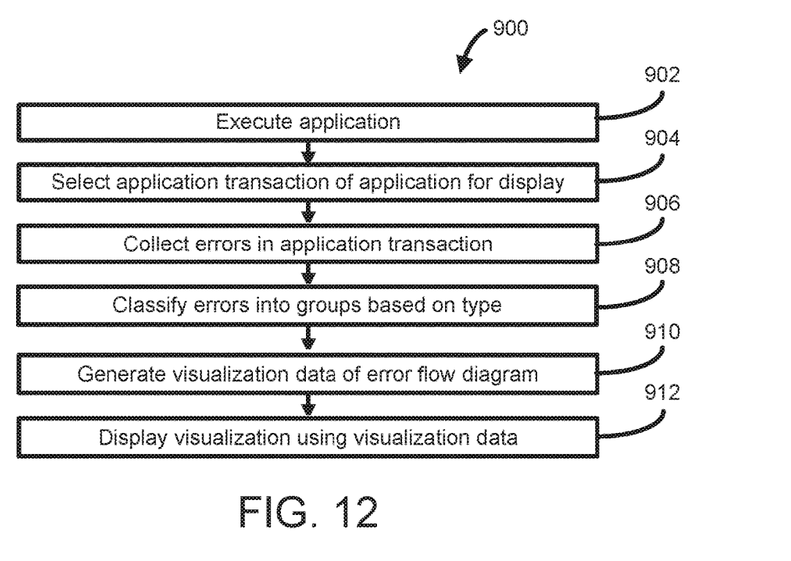

FIG. 12 is a flow diagram illustrating a method 900 according to some examples. In some examples, the orderings shown may be varied, some elements may occur simultaneously, some elements may be added, and some elements may be omitted. In describing FIG. 12, reference will be made to elements described in FIG. 4. In examples, any of the elements described earlier relative to FIG. 4-11 may be implemented in the process shown in and described relative to FIG. 12.

At 902, an application may begin execution, as described earlier.

At 904, the transaction selector 112 may receive a transaction selection entered by a user (e.g. an administrator or IT professional) into the input device 112. The transaction selection may represent an application transaction that the user is to monitor for errors in a visualization comprising an error flow diagram. Any processes previously described as implemented by the transaction selector 112 may be implemented at 904.

At 906, the error collector 114 may collect, from an application in the application layer 104 and through a communication interface of the error flow system 110, error data representing errors that occurred in a plurality of instances of the selected application transaction executed by the application in the application layer 104. Any processes previously described as implemented by the error collector 114 may be implemented at 904.

At 908, the error classifier 116 may, using the collected error data, aggregate the errors into groups based on type. Any processes previously described as implemented by the error classifier 116 may be implemented at 908.

At 910, the visualization data generator 118 may generate visualization data representing an error flow diagram to display. Any processes previously described as implemented by the visualization data generator 118 may be implemented at 910.

At 912, the visualization displayer 120 may cause a visualization to be displayed on the output device 124 using the visualization data representing the error flow diagram. Any processes previously described as implemented by the visualization displayer 120 may be implemented at 912.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject matter disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium comprising instructions executable by a processor to:
   collect error data representing a first plurality of errors of a first type and a second plurality of errors of a second type other than the first type, wherein the first plurality of errors of the first type occur in a plurality of instances of a sequence of operations occurring due to execution of code of an application, and the second plurality of errors of the second type occur due to the plurality of instances of the sequence of operations; and
   generate visualization data representing an error flow diagram to display on an output device, the error flow diagram comprising a first block having a first visual property based on a first number of the first plurality of errors, a second block having a second visual property based on a second number of the second plurality of errors, and a first linkage between the first block and the second block.

2. The non-transitory computer-readable storage medium of claim 1 wherein the visualization data represents that, for each instance of the plurality of instances, an error of the first plurality of errors occurring in the instance occurs before an error of the second plurality of errors occurring to occur in the instance.

3. The non-transitory computer-readable storage medium of claim 2 wherein the first plurality of errors occurs in first code of the application and the second plurality of errors occurs in second code of the application, wherein the second code is to be called by third code using a synchronous function call such that, for each instance of the plurality of instances, the error of the first plurality of errors occurring in the instance is to occur before the error of the second plurality of errors occurs in the instance.

4. The non-transitory computer-readable storage medium of claim 2 wherein the first plurality of errors occurs in first code of the application and the second plurality of errors occurs in second code of the application, wherein the first code is to be called by the second code using an asynchronous function call.

5. The non-transitory computer-readable storage medium of claim 1 wherein
   the error data further represents a third plurality of errors of a third type occurring in the plurality of instances of the application, and
   the error flow diagram comprising a third block having a third-size based on a third number of the third plurality of errors and a second linkage between the first block and the third block.

6. The non-transitory computer-readable storage medium of claim 5 wherein the visualization data represents that, for each instance of the plurality of instances, an error of the first plurality of errors occurring in the instance occurs later than an error of the second plurality of errors occurring in the instance and later than an error of the third plurality of errors occurring in the instance.

7. The non-transitory computer-readable storage medium of claim 1, wherein the first plurality of errors occurs in a first portion of the code, wherein the first portion of the code is executed in a server of a computing device layer, the second plurality of errors occurring in a second portion of the code, and the second portion of the code being executed in a database server of a database layer.

8. The non-transitory computer-readable storage medium of claim 1 wherein the first visual property is a first size, and the second visual property is a second size that is different from the first size.

9. The non-transitory computer-readable storage medium of claim 8 wherein the first size is proportional to the first number of the first plurality of errors, and the second size is proportional to the second number of the second plurality of errors.

10. The non-transitory computer-readable storage medium of claim 1 further comprising instructions executable by the processor to group the first plurality of errors into a first group of errors of the first type and to group the second plurality of errors in a second group of errors of the second type.

11. The non-transitory computer-readable storage medium of claim 1 further comprising instructions executable by the processor to receive, from an input device, a user selection of the application from which to collect the error data and for which to generate the visualization data.

12. The non-transitory computer-readable storage medium of claim 1 wherein the first linkage has a third visual property based on at least one of the first number and the second number.

13. The non-transitory computer-readable storage medium of claim 12 wherein the third visual property is a third size.

14. The non-transitory computer-readable storage medium of claim 12 wherein the third visual property is based on the first number and the second number.

15. A system comprising:
a processor; and
a memory comprising instructions executable by the processor to:
collect error data representing errors occurring in a plurality of instances of a sequence of operation caused by execution of code of an application;
group the errors into a first group of errors of a first type and a second group of errors of a second type other than the first type; and
generate visualization data representing an error flow diagram to display on an output device, the error flow diagram comprises a first block, a second block, and a first linkage between the first block and the second block, wherein the first linkage has a first visual property based on at least one of a first number of the first group of errors and a second number of the second group of errors.

16. The system of claim 15 wherein
the error data further represents a third plurality of errors of a third type occurring in the plurality of instances of the application, and
the error flow diagram comprises a third block and a second linkage between the first block and the third block, wherein the second linkage has a second visual property based on at least one of the first number of the first group of errors and a third number of a third group of errors.

17. The system of claim 16 wherein the first visual property is a first size and the second visual property is a second size, wherein the first visual property is based on the first number and the second number, wherein the second visual property is based on the first number and the third number.

18. The system of claim 15, wherein the visualization data represents that, for each instance of the plurality of instances, an error of the first group of errors occurring in the instance occurs later than an error of the second group of errors occurring in the instance and later than an error of a third group of errors occurring in the instance.

19. A method comprising:
collecting, by a processor, error data representing a first plurality of errors of a first type and a second plurality of errors of a second type other than the first type, wherein the first plurality of errors of the first type occur in a plurality of instances of a sequence of operations occurring due to execution of code of an application, and the second plurality of errors of the second type occur due to the plurality of instances of the sequence of operations; and
displaying, on an output device, a visualization comprising an error flow diagram linking a first block having a first visual property based on a first number of the first plurality of errors and a second block having a second visual property based on a second number of the second plurality of errors, wherein the visualization represents an inference that the first plurality of errors caused the second plurality of errors.

20. The method of claim 19 wherein the visualization represents that, for each instance of the plurality of instances, an error of the first plurality of errors occurring in the instance occurs earlier in time relative to an error of the second plurality of errors occurring in the instance.

* * * * *